US011170358B2

(12) United States Patent
Connell et al.

(10) Patent No.: US 11,170,358 B2
(45) Date of Patent: Nov. 9, 2021

(54) SYSTEM, METHOD, AND RECORDING MEDIUM FOR IDENTITY FRAUD PREVENTION IN SECURE TRANSACTIONS USING MULTI-FACTOR VERIFICATION

(71) Applicant: International Business Machines Corporation, Armonk, NY (US)

(72) Inventors: Jonathan H. Connell, Cortlandt-Manor, NY (US); Nalini K. Ratha, White Plains, NY (US); Roberto Sicconi, Ridgefield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 410 days.

(21) Appl. No.: 15/142,717

(22) Filed: Apr. 29, 2016

(65) Prior Publication Data

US 2017/0316399 A1 Nov. 2, 2017

(51) Int. Cl.
G06Q 20/32 (2012.01)
G06Q 20/40 (2012.01)

(52) U.S. Cl.
CPC ... G06Q 20/3224 (2013.01); G06Q 20/40145 (2013.01)

(58) Field of Classification Search
CPC .. G06F 19/00; G06F 7/20; H04L 9/00; G06Q 20/3224; G06Q 20/40145
USPC ............ 726/7–5; 705/3, 44, 35–40
See application file for complete search history.

(56) References Cited

U.S. PATENT DOCUMENTS

| | | | | |
|---|---|---|---|---|
| 7,421,399 B2* | 9/2008 | Kimmel | ............... | G06F 19/322 |
| | | | | 435/5 |
| 9,077,714 B2* | 7/2015 | Neuman | ............... | H04W 12/06 |
| 9,111,402 B1* | 8/2015 | Krishnan | ............... | G07C 1/10 |
| 9,471,919 B2* | 10/2016 | Hoyos | ............... | G06Q 20/327 |
| 9,641,526 B1* | 5/2017 | Gopalakrishnan | ............ | |
| | | | | G06Q 20/40145 |
| 9,805,182 B1* | 10/2017 | Kayyidavazhiyil | ..... | G06F 21/36 |

(Continued)

FOREIGN PATENT DOCUMENTS

WO WO-2015052676 A1 * 4/2015 ............. G06Q 20/34

OTHER PUBLICATIONS

Lami et al. LocBiometrics: Mobile phone based multifactor biometric authentication with time and location assurance. 18th Telecommunications forum TELFOR 2010. Serbia, Belgrade, Nov. 23-25, 2010. (Year: 2010).*

*Primary Examiner* — Virpi H Kanervo
(74) *Attorney, Agent, or Firm* — Anthony Curro, Esq.; McGinn I.P. Law Group, PLLC.

(57) ABSTRACT

A secure transaction method, system, and non-transitory computer readable medium, for authorizing a transaction between a user having a personal communication device, a service provider, and a payment provider, include requesting a distribution of a location challenge code to the service provider and a distribution of a biometric data request to the personal communication device of the user, verifying the biometric data of the user based on a match of received biometric data from the user and with biometric data of the user stored in a storage unit, verifying that the location challenge code sent from the personal communication device of the user matches the distributed location challenge code, and sending a verification of authentication of the location challenge code and the match to the payment provider.

20 Claims, 5 Drawing Sheets

(56) References Cited

U.S. PATENT DOCUMENTS

| | | | |
|---|---|---|---|
| 2002/0111818 A1* | 8/2002 | Morar | G06Q 30/06 705/26.1 |
| 2007/0005967 A1* | 1/2007 | Mister | H04L 9/3228 713/168 |
| 2007/0136573 A1* | 6/2007 | Steinberg | G06F 21/43 713/155 |
| 2008/0275748 A1* | 11/2008 | John | G06F 21/6263 705/35 |
| 2009/0328175 A1* | 12/2009 | Shuster | G06F 21/36 726/7 |
| 2010/0153451 A1* | 6/2010 | Delia | G06Q 20/40 707/781 |
| 2012/0140993 A1* | 6/2012 | Bruso | G06K 9/00899 382/118 |
| 2012/0233013 A1 | 9/2012 | Smith | |
| 2012/0240204 A1* | 9/2012 | Bhatnagar | H04L 63/0428 726/5 |
| 2013/0046692 A1* | 2/2013 | Grigg | G06Q 20/4016 705/44 |
| 2014/0250512 A1* | 9/2014 | Goldstone | H04L 63/0838 726/6 |
| 2014/0289116 A1* | 9/2014 | Polivanyi | H04L 9/3297 705/44 |
| 2015/0088751 A1* | 3/2015 | Grigg | G06Q 40/00 705/44 |
| 2016/0019547 A1* | 1/2016 | Gurnani | G06Q 20/40145 705/44 |
| 2016/0379211 A1* | 12/2016 | Hoyos | G06F 21/335 705/75 |
| 2017/0004486 A1* | 1/2017 | Dhala | G06Q 20/34 |

\* cited by examiner

SYSTEM, METHOD, AND RECORDING MEDIUM FOR IDENTITY FRAUD PREVENTION IN SECURE TRANSACTIONS USING MULTI-FACTOR VERIFICATION

BACKGROUND

The present invention relates generally to a secure transaction system, and more particularly, but not by way of limitation, to a system for capturing biometric data of a user and a location of the user to verify identity of the user to process a secure transaction.

Conventional techniques create an event record where the event record creates an association between the biometric signature, a patient identifier, and location information based on the biometric signature indicating a location at which the biometric signature is obtained. However, the transaction information is not encoded and no local verification of location is envisaged in these conventional techniques.

Other conventional techniques consider using a networked laptop computer having identity capturing systems such as a bar code reader, magnetic card reader, smartcard reader, RF transponder, a fingerprint capture, a signature capture, a photo image capture or a facial recognition software for the patient, the medical service provider, and may have a Global Position System (GPS) signal, or other location system, to ensure that the ID capture occurs at the authorized location. However, the conventional techniques only use a local verification and no remote verification is considered.

Thus, there is a technical problem in the conventional techniques in that the conventional techniques utilize a local transaction verification technique and no remote verification is used.

SUMMARY

The inventors have considered the technical solution to the technical problem in which a dynamic location and transaction encoded into a programmable tag (e.g., Quick Response Code (QR code), Near Field Communication (NFC)) for the transaction to be approved in which two split identity verification channels are used (i.e., patient and provider) and the two verification results are combined along with the programmable tag code to approve the transaction.

In an exemplary embodiment, the present invention can provide a secure transaction system for authorizing a transaction between a user having a personal communication device, a service provider, and a payment provider, the system including a transaction requesting circuit configured to receive a transaction request and to distribute a location challenge code to the service provider and to distribute a biometric data request to the personal communication device of the user, a biometric data receiving circuit configured to receive biometric data from the user based on the biometric data request, a location code receiving circuit configured to receive the location challenge code from the personal communication device of the user, and a verifying circuit configured to verify the biometric data of the user based on a match with biometric data of the user stored in a storage unit, to verify that the location challenge code sent from the personal communication device of the user matches the distributed location challenge code, and to send a verification of authentication of the location challenge code and the match to the payment provider.

Further, in another exemplary embodiment, the present invention can provide a secure transaction method for authorizing a transaction between a user having a personal communication device, a service provider, and a payment provider, the method including requesting a distribution of a location challenge code to the service provider and a distribution of a biometric data request to the personal communication device of the user, verifying the biometric data of the user based on a match of received biometric data from the user and with biometric data of the user stored in a storage unit, verifying that the location challenge code sent from the personal communication device of the user matches the distributed location challenge code, and sending a verification of authentication of the location challenge code and the match to the payment provider.

Even further, in another exemplary embodiment, the present invention can provide a non-transitory computer-readable recording medium recording a secure transaction program for authorizing a transaction between a user having a personal communication device, a service provider, and a payment provider, the program causing a computer to perform requesting a distribution of a location challenge code to the service provider and a distribution of a biometric data request to the personal communication device of the user, verifying the biometric data of the user based on a match of received biometric data from the user and with biometric data of the user stored in a storage unit, verifying that the location challenge code sent from the personal communication device of the user matches the distributed location challenge code, and sending a verification of authentication of the location challenge code and the match to the payment provider.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
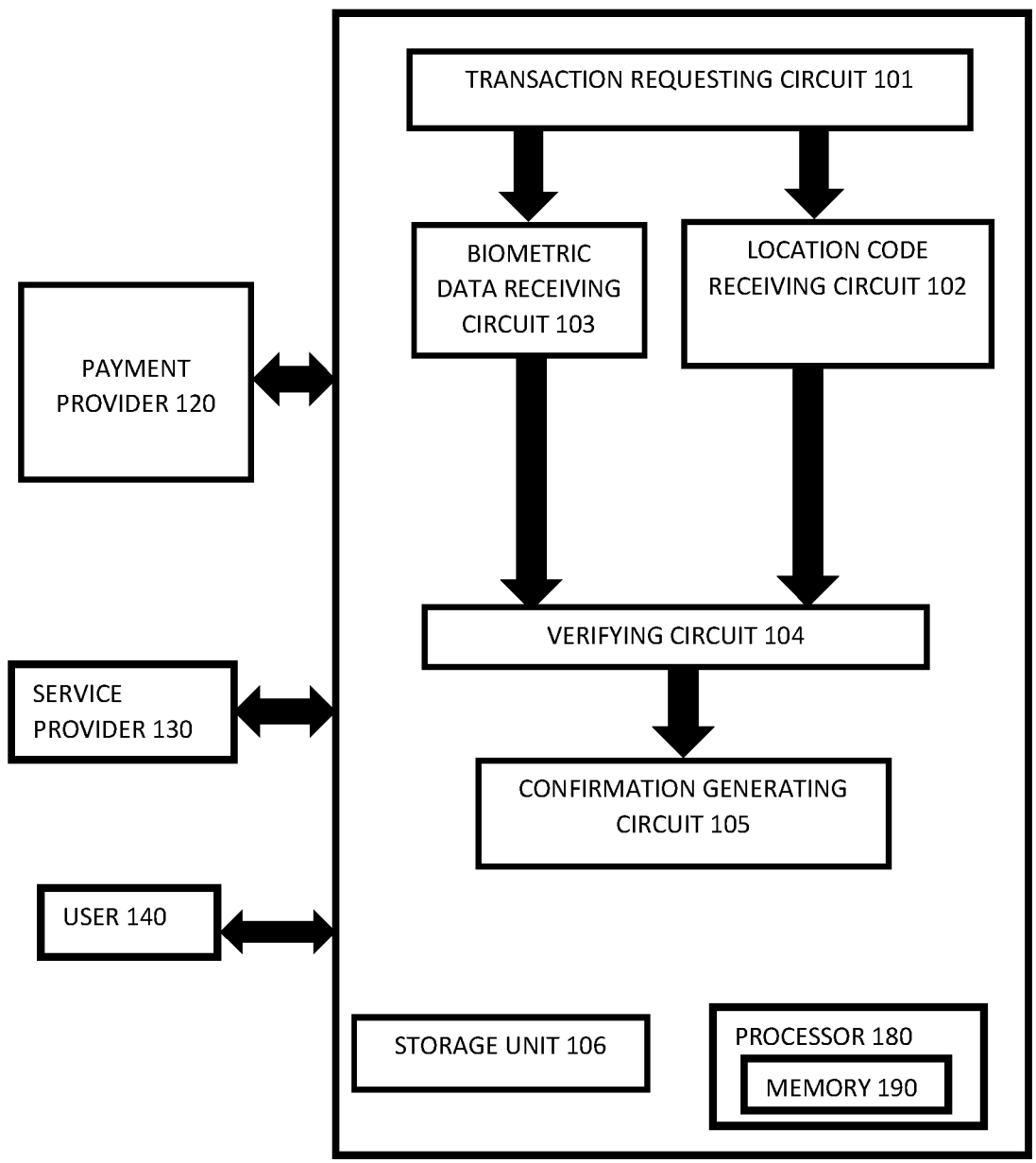
FIG. 1 exemplarily shows a block diagram illustrating a configuration of a secure transaction system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the secure transaction system 100 includes a transaction requesting circuit 101, a location code receiving circuit 102, a biometric data receiving circuit 103, a verifying circuit 104, and a confirmation generating circuit 105. The system 100 further includes a storage unit 106 which stores user and service provider profiles including biometric data of the users and locations of the service providers. The secure transaction system 100 includes a processor 180 and a memory 190, with the memory 190 storing instructions to cause the processor 180 to execute each circuit of secure transaction system 100. The processor and memory may be physical hardware components, or a combination of hardware and software components.

Although the secure transaction system 100 includes various circuits, it should be noted that a secure transaction system can include modules in which the memory 190 stores instructions to cause the processor 180 to execute each module of secure transaction system 100.

Also, each circuit can be a stand-alone device, unit, module, etc. that can be interconnected to cooperatively produce a transformation to a result.

With the use of these various circuits, the secure transaction system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a cognitive state. The present application also describes the analysis, categorization, and identification of these cognitive states by means of further feature analysis of subgraphs, including dimensionality reduction of the subgraphs, for example by means of graphical analysis, which extracts topological features and categorizes the resultant subgraph and its associated feature nodes and edges within a subgraph feature space.

Figure 3:
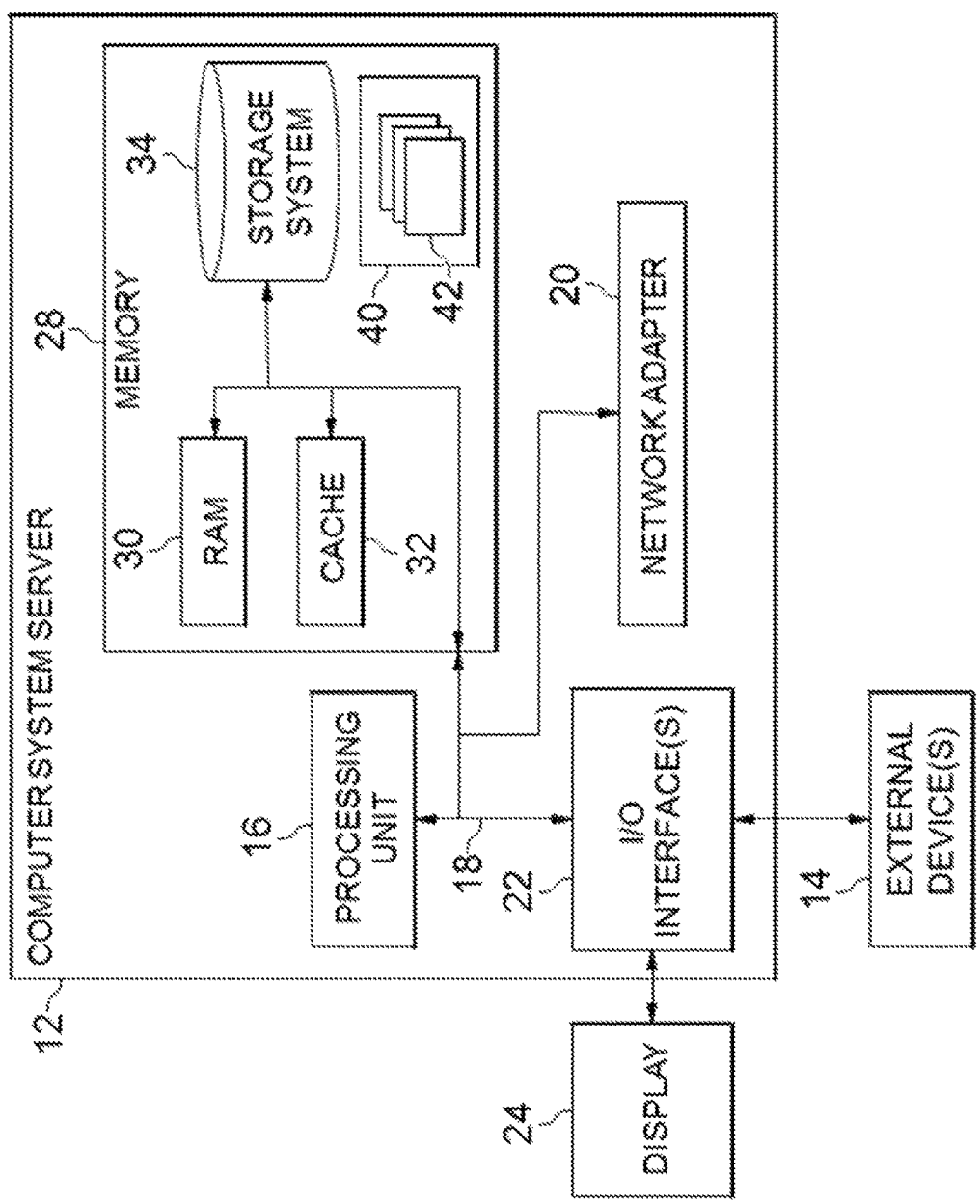
FIG. 3 depicts a cloud computing node 10 according to an embodiment of the present invention.
Figure 4:
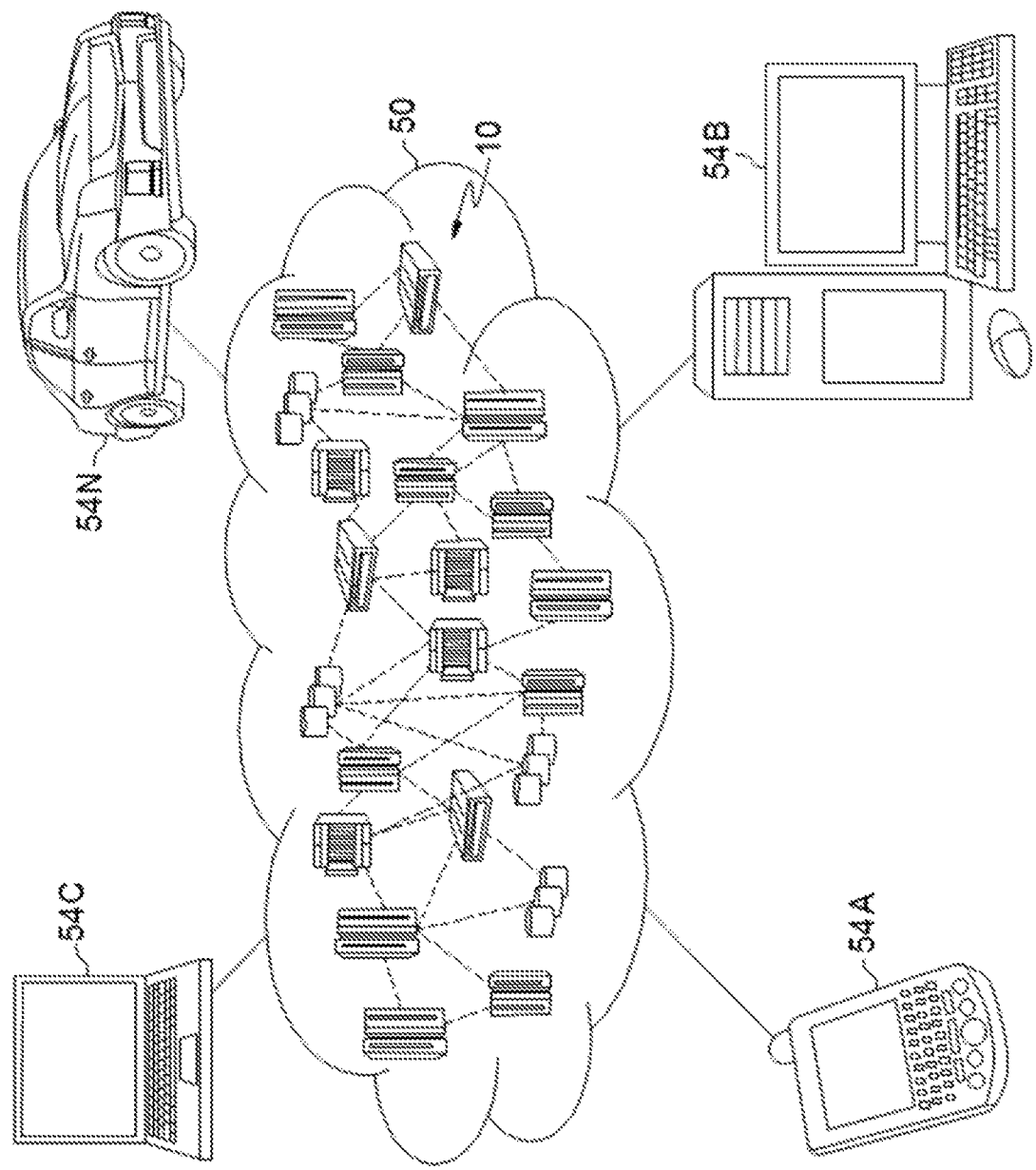
FIG. 4 depicts a cloud computing environment 50 according to another embodiment of the present invention.
Figure 5:
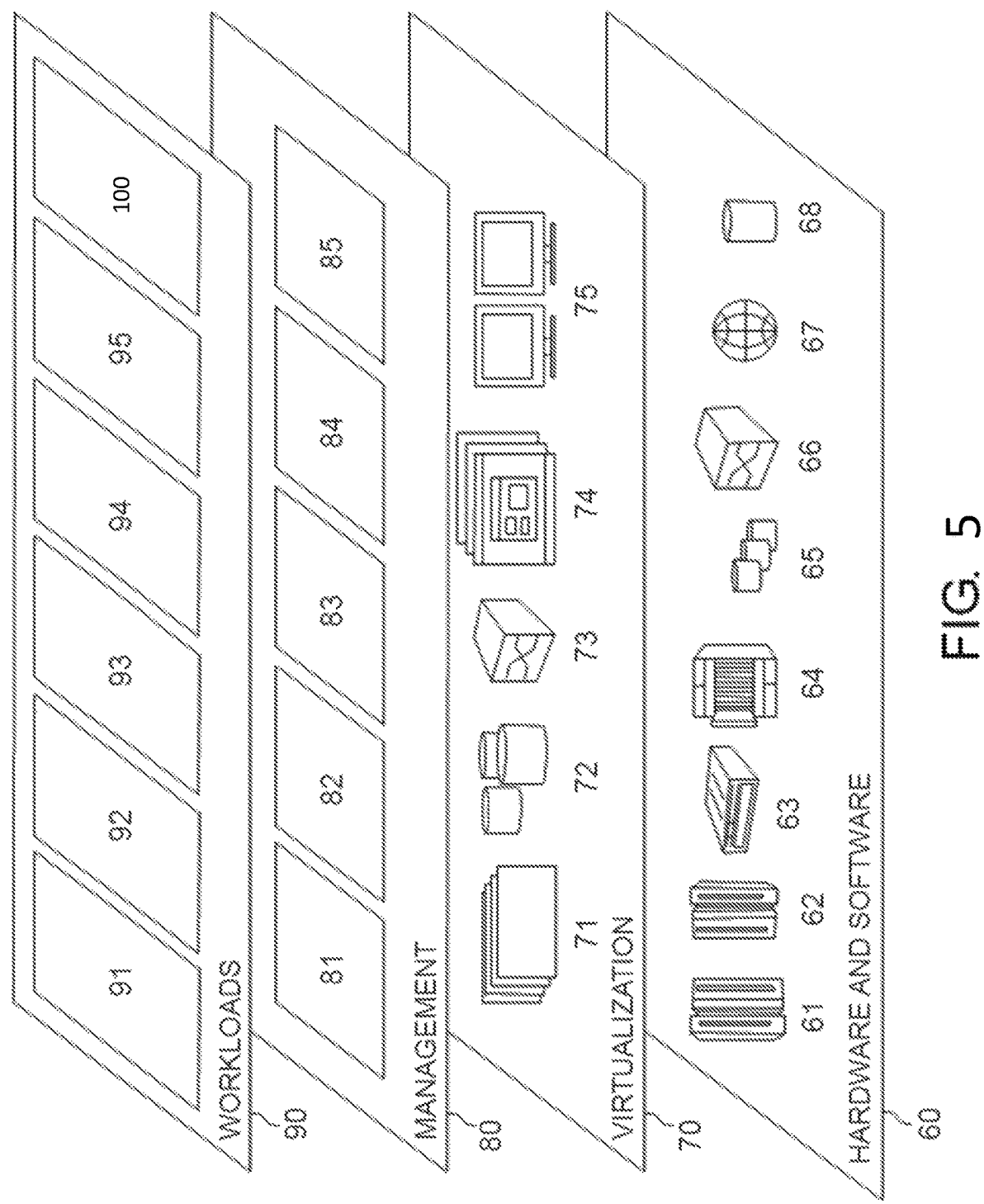
FIG. 5 depicts abstraction model layers according to an embodiment of the present invention.

Although as shown in FIGS. 3-5 and as described later, the computer system/server 12 is exemplarily shown in cloud computing node 10 as a general-purpose computing circuit which may execute in a layer the secure transaction system 100 (FIG. 5), it is noted that the present invention can be implemented outside of the cloud environment.

The secure transaction system 100 facilitates a secure transaction between a user 140, a service provider 130, and a payment provider 120. That is, the user 140 (i.e., a patient, customer, etc.) requests a transaction at a facility of the service provider 130 (i.e., a hospital, a store, a care center, etc.). The service provider 130 requests the transaction approver 120 to send a location confirmation challenge to a screen at the facility of the service provider 130.

It is noted that the user 140 communicates with the secure transaction system 100 via a personal communication device such as a smart phone, tablet, or the like. The system 100 has a personal communication device of record stored for each user.

The service provider 130 receives the location confirmation challenge (i.e., a dynamic generated code that the user can confirm using the personal communication device) and displays the location confirmation challenge on a screen (display area) for the user 140. The user 140 can, for example, take a picture of the location confirmation challenge on the screen generated uniquely for the specified transaction. The location confirmation challenge can include a QR code, an NFC, or the like.

At the same time as the location confirmation challenge, the service provider 130 queries the user 140 for a biometric confirmation of identity. The user 140 can, for example, take a picture of their face, use a fingerprint reading device, iris scan, or the like to generate biometric data to send to the secure transaction system 100. The payment provider 120 receives the location confirmation challenge and the biometric data from the user 140 via the system 100 to verify the identity of the user 140. The service provider 130 then sends a confirmation code to the payment provider 120 and the user 140 that indicates that the service provider 120 is approved to provide a service to the user 140 because the identity of the user 140 has been confirmed.

The confirmation code can include a 2-dimensional bar code, a random generated number, or the like.

With regard to the secure transaction system 100, the transaction requesting circuit 101 receives a request for confirmation to proceed with a transaction from the service provider 130.

When the transaction requesting circuit 101 receives the request, the secure transaction system 100 signals for the payment provider 120 to send a dynamic location confirmation code to the service provider 130 and for the user 140 to enter biometric data. The biometric data receiving circuit 103 receives the biometric data and the location code receiving circuit 102 receives the dynamic location confirmation code from the user 140.

It is noted that the location can be determined based on a Global Positioning System (GPS) in the user device, but preferably the location is determined based on the user 140 sending the dynamic location code to the location code receiving circuit 102. That is, in order for the user 140 to take a picture or input a random generated number or the like, the user 140 will necessarily need to be in close proximity to the service provider 130 that received the dynamic location confirmation code. Preferably, the biometric data is a picture of the users face such that facial recognition can be utilized by the verifying circuit 104.

Also, the biometric data can act as a location indicator if, for example, the user 140 inputs a finger-print as the biometric data. However, the user 140 preferably takes a picture of a face of the user 140 and sends the picture to the biometric data receiving circuit 103. Each user 140 can create a profile in the secure transaction system 100 that includes a preferred device that the user 140 will use to take the picture. In this manner, the picture and data indicating the device is sent to the secure transaction system by the user 140.

The verifying circuit 104 verifies that the biometric data of the user 140 matches biometric data stored of the user 140. The verifying circuit 104 determines a percentage likelihood that the user 140 is the correct user. In other words, the verifying circuit 104 creates a local biometric verification score. The system 100 includes a storage unit 106 for storing valid users including their biometrics and the identity of their personal communication device and valid service providers including a location of the facility.

Also, the verifying circuit 104 verifies that the dynamic location code that the user sent to the secure transaction system 100 matches the dynamic location code that the transaction requesting circuit 101 sent to the service provider 130. The verifying circuit 104 verifies the biometric data of the user 140 and the location of the user 140 based on the data stored in the storage unit 106.

The confirmation generating circuit 105 generates a confirmation code to send to the user 140 and the service provider 130 if the verifying circuit 104 verifies that the user 140 has a biometric verification score greater than a threshold value and a location of the user 140 matches the service provider 130 based on the location code.

Although the biometric data of the user 140 and the location code is sent to a single payment provider 120, each can be sent to a different payment provider 120 and each payment provider 120 can verify the data of the user 140 via the verifying circuit 104. Therefore, an extra layer of security can be provided by using multiple servers for payment providers 120.

The secure transaction system 100 can prevent identity fraud by utilizing the circuits described above to facilitate the transaction between a service provider 130 and a user 140 in at least that a random stranger cannot pass the location test because a phone of record is made to be associated with the user 140, credentials cannot be loaned to a known second user by the user 140 because biometrics are acquired, and the system 100 further prevents a service provider 130 from fraudulently billing a user 140 by at least the location code and the phone of record not being verifiable.

That is, the combination of the verifying circuit 104 verifying both of the biometric data and the location code sent by the user 140 achieves a higher threshold for a fraudulent transaction to occur than verifying one of the inputs. Further, since GPS data can be manipulated, the verifying circuit 104 verifies the location by receiving a picture that a user 140 can take only if the user 140 is in a close proximity to the service provider 130 thereby eliminating the chance for GPS data to be manipulated. Also, because the location code is a QR code, an NFC, or the like, the codes are dynamically and uniquely generated such that a fraudulent user cannot send a picture of the code to the secure transaction system 100 without being at the service provider 130.

The location code receiving circuit 102 can also include a timer such that after the location code is generated and sent to the service provider 130, a new code will be generated if the user 140 does not send the previous code to the location code receiving circuit 102 within a predetermined amount of time. Thus, the secure transaction system 100 can prevent a different user from taking a picture of the code at a later time.

Further, the personal communication device of the user 140 can request a provision of a service to be provided by the service provider 130 after the verifying circuit 104 confirms the biometric data and the location of the personal communication device is the same as that of the service provider 130.

Figure 2:
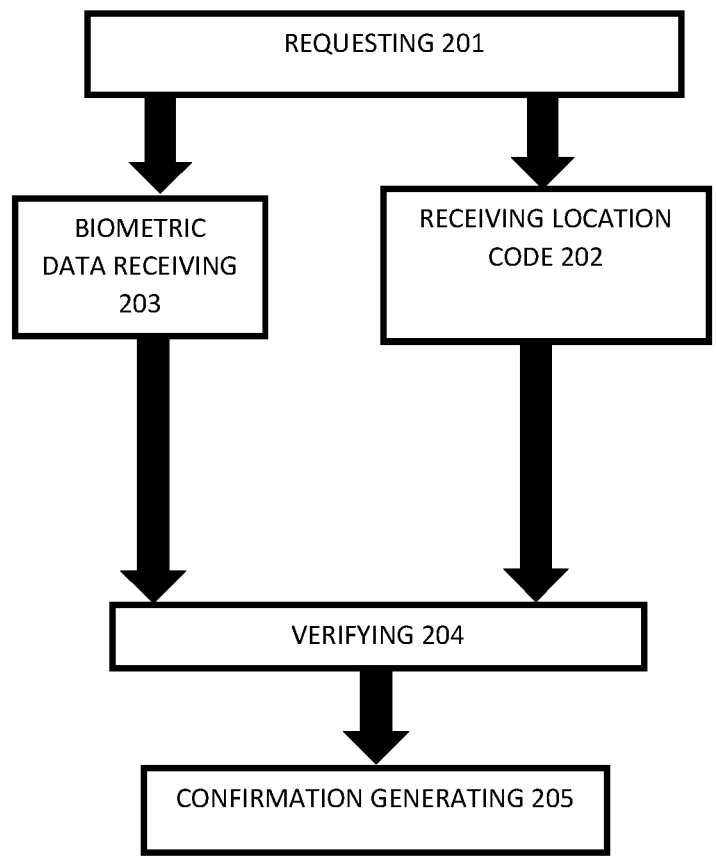
FIG. 2 exemplarily shows a high level flow chart for a secure transaction method 200.

FIG. 2 shows a high level flow chart for a method 200 of a secure transaction.

Step 201 receives a transaction request from a user 140 or a service provider 130 and sends a location code to the service provider 130. The user 140 can, for example, take a picture of the location code. The user 140 also provides biometric data by, for example, capturing a picture of the face of the user 140.

Step 202 receives the location code from the user 140 and Step 203 receives the biometric data from the user 140.

Step 204 verifies that the biometric data matches biometric data in a profile stored for the user 140. Also, Step 204 verifies that the location code matches the location code distributed to the services provider 130 in Step 201.

Step 205 generates a confirmation code to send to the user 140 and the service provider 130 if Step 204 verifies that the user 140 has a biometric verification score greater than a threshold value and a location of the user 140 matches the service provider 130 based on the location code.

That is, the exemplary embodiments disclosed herein include a means of uniquely ascertaining the identity of the personal communications device, a means of acquiring biometric signals from the personal communications device, a means of determining the physical location of the personal communication device, a database of valid users including their biometrics and the identity of their personal communications device, a database of valid service providers including the location of their service facilities, and where the personal communication device requests authorization for provision of a service by sending its identity, location, and biometrics to one or more servers which check the request against the databases.

By including the multiple layers of security and verification of identity, the exemplary embodiments can create a trusted channel with a user, a dynamic location and transaction encoded into a programmable tag (e.g., QR code, NFC) for the transaction to be approved, and two split identity verification channels (user and provider). Therefore, by combining the two verification results along with the programmable tag code to finally approve the payment, increased security can be achieved.

Also, by utilized a location challenge code displayed at the location of the service provider, the exemplary embodiments require that the user must be within a proximity of the service provider to capture the location challenge code. In other words, it is impossible for the registered device of the user to take a picture of a QR code unless the user is, for example, within a few feet of the displayed QR code at the service provider. Therefore, even if GPS data of the user device is manipulated by a potential fraudulent user, the fraudulent user cannot manipulate the dynamically created QR code from the user's personal communication device since the user must be within a few feet of the service provider to capture the QR code.

As a result, the exemplary embodiments provide an additional layer of security beyond GPS location by inherently requiring a physical location be the same to complete the transaction.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the secure transaction system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A secure transaction system for authorizing a transaction between a user having a personal communication device, a service provider, and a payment provider, the system comprising:
    at a local level at the service provider physically accessible by the user and before authorizing a transaction:
        a transaction requesting circuit configured to receive a transaction request and to distribute a location challenge code that is sent during each transaction from the payment provider to the service provider and to distribute a biometric data request indicative on a location of the user to the personal communication device of the user;
        a biometric data receiving circuit configured to receive biometric data from the personal communication device of the user based on the biometric data request; and
        a location code receiving circuit configured to receive the location challenge code from the personal communication device of the user that is entered based on a provided location challenge code that is provided by the service provider, the location challenge code being entered by the user in a form of a picture taken by the user while at a location of a facility of the service provider;
    at a remote level at the payment provider not physically accessible by the user:
        a verifying circuit configured to:
            verify the biometric data of the user based on a match with biometric data of the user stored in a storage unit;
            verify that the location challenge code sent from the personal communication device of the user matches the distributed location challenge code; and
            send,to the service provider, a verification of authentication of the location challenge code and the match to the payment provider; and
        a confirmation generating circuit configured to generate and send a confirmation code to the user and to the service provider at a same physical location as the user if the biometric data of the user matches the stored biometric data of the user and the location challenge code matches the distributed location challenge code, wherein the transaction is performed at the local level by the service provider when the confirmation code is received from the remote level.

2. The system of claim 1, wherein the biometric data comprises each of:
    an image of the user;
    an image of a face of the user captured by the personal communication device; and
    a fingerprint of the user.

3. The system of claim 1, wherein the personal communication device captures an in of the location challenge code at the location of the facility of the service provider such that the personal communication device must be within a predetermined vicinity of the facility and at a physical location of the user.

4. The system of claim 1, wherein the location challenge code comprises at least one of a quick response code (QR code) and a near field communication (NFC) packet.

5. The system of claim 1, wherein the location challenge code is configured such that the location challenge code can only be recognized by the personal communication device if the user is within a predetermined distance from a location of the service provider and a physical location of the user.

6. The system of claim 5, wherein the personal communication device captures an image of the location challenge code at the location of the facility of the service provider such that the personal communication device must be within a predetermined vicinity of the facility.

7. The system of claim 1, wherein the biometric data receiving circuit receives the biometric data on a first server, wherein the location code receiving circuit receives the location challenge code on a second server, and wherein the first server and the second server each include the verifying circuit such that the first server and the second server individually verify the biometric data and the location challenge code, respectively.

8. The system of claim 1, wherein the confirmation code is sent in a separate communication to the user and the service provider such that each independently verifies the other.

9. A secure transaction method for authorizing a transaction between a user having a personal communication device, a service provider, and a payment provider, the method comprising:
    at a local level at the service provider physically accessible by the user and before authorizing a transaction:
        requesting a distribution of a location challenge code to the service provider and a distribution of a biometric data request indicative on a location of the user to the personal communication device of the user; and verifying biometric data of the user based on a match between received biometric data from the personal communication device of the user and biometric data of the user stored in a storage unit;

at a remote level at the payment provider not physically accessible by the user:

verifying that the location challenge code sent from the personal communication device of the user that is entered based on a provided location challenge code that is provided by the service provider matches the distributed location challenge code, the location challenge code being entered by the user in a form of a picture taken by the user while at a location of a facility of the service provider;

sending, to the service provider, a verification of authentication of the location challenge code and the match to the payment provider; and generating and sending a confirmation code to the user and to the service provider if the biometric data of the user matches the stored biometric data of the user and the location challenge code matches the distributed location challenge code; and performing the transaction at the local level by the service provider when the verification is received from the remote level.

10. The method of claim 9, wherein the biometric data comprises at least one of:

an image of the user;

an image of a face of the user captured by the personal communication device; and a finger print of the user.

11. The method of claim 9, wherein the personal communication device captures an image of the location challenge code at the location of the facility of the service provider such that the personal communication device must be within a predetermined vicinity of the facility.

12. The method of claim 9, wherein the location challenge code comprises at least one of a quick response code (QR code) and a near field communication (NFC) packet.

13. The method of claim 9, wherein the location challenge code is configured such that the location challenge code can only be recognized by the personal communication device if the user is within a predetermined distance from a location of the service provider.

14. The method of claim 13, wherein the personal communication device captures an image of the location challenge code at the location of the facility of the service provider such that the personal communication device must be within a predetermined vicinity of the facility.

15. The method of claim 9, wherein the confirmation code is sent in a separate communication to the user and the service provider such that each independently verifies the other.

16. A non-transitory computer-readable recording medium recording a secure transaction program for authorizing a transaction between a user having a personal communication device, a service provider, and a payment provider, the program causing a computer to perform:

at a local level at the service provider physically accessible by the user and before authorizing a transaction:

requesting a distribution of a location challenge code to the service provider and a distribution of a biometric data request indicative on a location of the user to the personal communication device of the user; and verifying biometric data of the user based on a match between received biometric data from the personal communication device of the user and biometric data of the user stored in a storage unit;

at a remote level at the payment provider not physically accessible by the user:

verifying that the location challenge code sent from the personal communication device of the user that is entered based on a provided location challenge code that is provided by the service provider matches the distributed location challenge code, the location challenge cock being entered by the user in a form of a picture taken by the user while at a location of a facility of the service provider;

sending, to the service provider, a verification of authentication of the location challenge code and the match to the payment provider; and generating and sending a confirmation code to the user and to the service provider if the biometric data of the user matches the stored biometric data of the user and the location challenge code matches the distributed location challenge code; and performing the transaction at the local level by the service provider when the verification is received from the remote level.

17. The non-transitory computer-readable medium of claim 16, wherein the biometric data comprises at least one of:

an image of the user;

an image of a face of the user captured by the personal communication device; and a finger print of the user.

18. The non-transitory computer-readable medium of claim 16, wherein the personal communication device captures an image of the location challenge code at the location of the facility of the service provider such that the personal communication device must be within a predetermined vicinity of the facility.

19. The non-transitory computer-readable medium of claim 16, wherein the location challenge code comprises at least one of a quick response code (QR code) and a near field communication (NFC) packet.

20. The non-transitory computer-readable medium of claim 16, wherein the confirmation code is sent in a separate communication to the user and the service provider such that each independently verifies the other.

* * * * *